Figure 1:
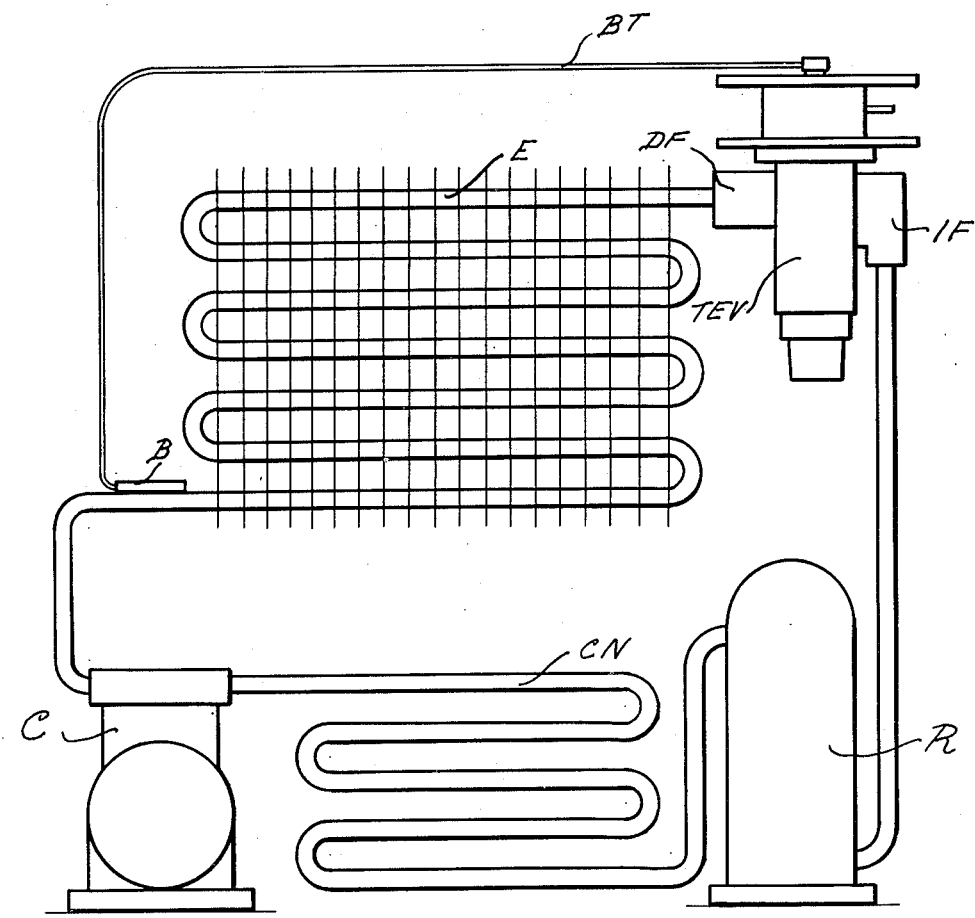

INVENTOR:
HAROLD T. LANGE,
By Robert B. Terry
ATTORNEY

Patented Nov. 21, 1950

2,530,706

UNITED STATES PATENT OFFICE 2,530,706

LOAD LIMITING MEANS FOR USE WITH REFRIGERATION AND OTHER VALVES

Harold T. Lange, Webster Groves, Mo., assignor to Sporlan Valve Company, St. Louis, Mo., a corporation of Missouri Application August 30, 1946, Serial No. 693,973

4 Claims. (Cl. 236—92)

1

This invention relates to improvements in load limiting means for use with refrigeration and other valves, and more particularly to a device providing an automatic restrictive or limiting effect in the control of fluid actuated valve assemblies, for example but without restriction, thermostatic expansion valves for use in compressor-condenser-evaporator systems.

An operational difficulty has heretofore prevailed in refrigerant systems of the type noted, particularly under pull-down conditions. In refrigerant systems of the prevailing compressor-condenser-evaporator type, upon first starting the system particularly after it has been out of service for some time, or following an off cycle, it usually results that the evaporator pressure attains much higher values than in the course of normal or continuous operation. Such high evaporator pressures result in overloading the compressor prime mover, usually an electric motor, tending to overheat and sometimes to stall the motor. A similar situation prevails of course when the refrigeration load is much above normal values for any reason.

It has been determined that if a satisfactory expedient is attainable for limiting the evaporator pressure, hence the load on the compressor drive unit, to certain values such that the load may be safely handled, obvious benefits will result. The present invention accordingly has this purpose as its principal objective.

Still another object of importance leading to the present design, is attained in a simple, low-cost device which may be utilized as an attachment to thermostatic expansion valves of existing orders and types, or optionally, may be assembled as parts of fluid-actuated valves of a great variety of designs, and for many fields of usage.

Yet another valuable objective of the invention is attained in a pressure translating device for use between a valve and a power-actuator therefor, and which is so constructed as to limit the pressure transmitted in either direction, i. e., to or from the valve, assumed to be operated under opposing pressures.

Yet another object of the invention is attained in a valve actuating connection, for use in fields akin to refrigeration, heating, etc., in which there is provided an automatic function under certain valve operating conditions, of limiting the valve actuating pressure, while under other conditions of operation to meet optimum requirements, the unit or attachment functions as a rigid or solid valve operating agency.

2

Figure 2:
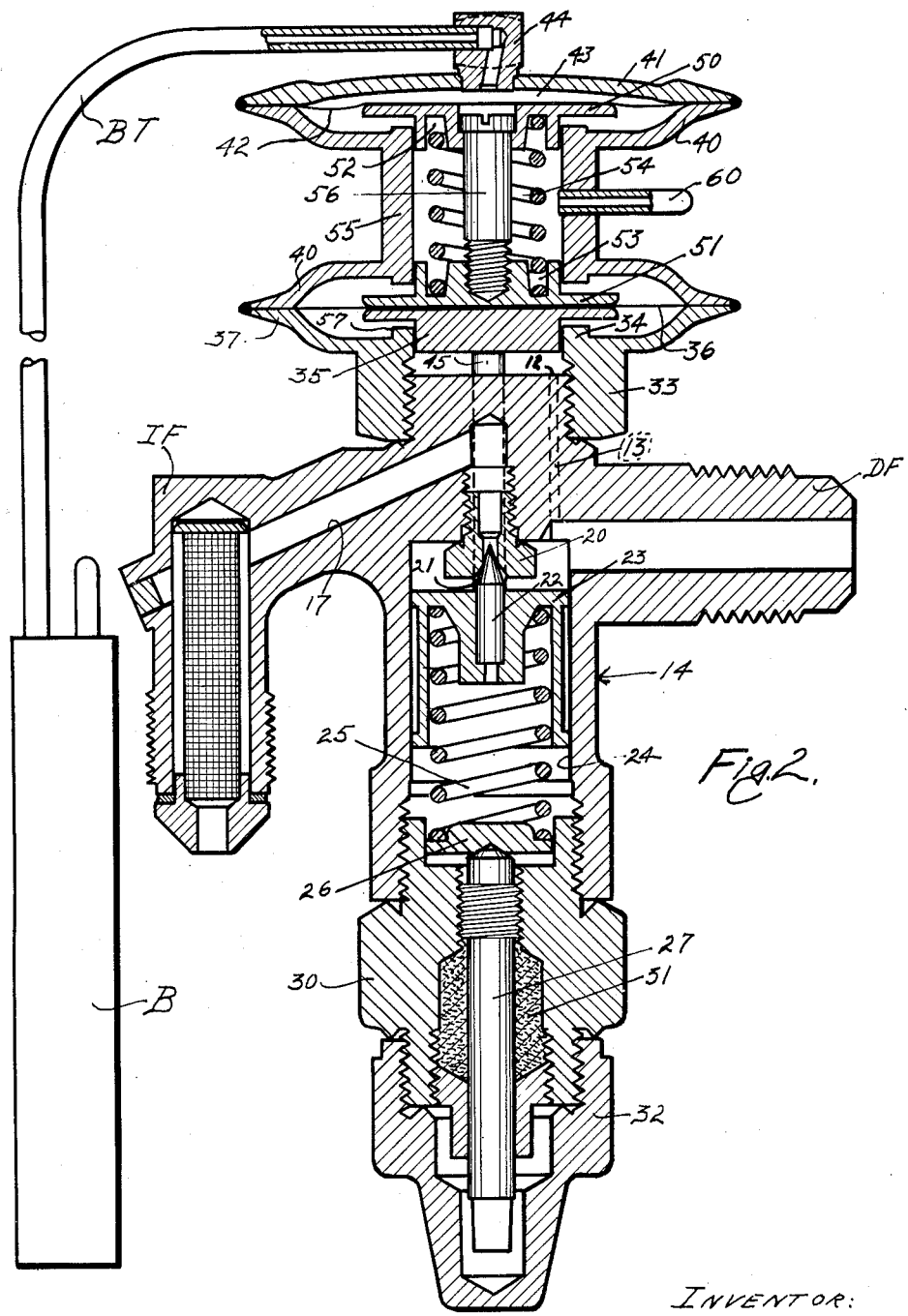

The foregoing and numerous other objects will more clearly appear from the following detailed description of a presently preferred embodiment of the attachment and its combination with a thermostatic expansion valve, and from the drawings, in which:

Fig. 1 is a schematic flow diagram of a compressor-condenser-evaporator system for refrigeration or comfort cooling, and in which the present improvements are embodied, and Fig. 2 is a vertical sectional elevation on a somewhat larger scale than Fig. 1, showing a thermostatic expansion valve equipped with present improvements.

Referring now by characters of reference to the drawing, and first to Fig. 1, a typical system in which the present improvements may be installed, includes a compressor C discharging into a condenser CN which in turn delivers liquid refrigerant into a receiver R. As in usual practice the receiver R communicates through the usual tubing in a closed refrigerant circuit, with the inlet fitting IF of a thermostatic expansion valve TEV. The discharge fitting DF of valve assembly TEV, supplies an evaporator E, the final pass or tube of which is suitably connected through the suction line back to compressor C. As thus far described, the system is or may be of conventional order and type, and may be considered as installed either for refrigeration in the restricted sense, or for comfort cooling purposes. As indicating either or any such usage in a broad sense, the system will be generally herein referred to as a cooling system, irrespective of specific field of usage.

The conventional system thus far described is modified, as through a port located at 12, and communicating through a bore 13 with the space immediately below the diaphragm assembly, as will later hereinafter appear.

As in usual practice, a thermally responsive fluid-filled bulb B is located substantially as shown near the outlet of the evaporator E, so as to be responsive to refrigerant temperature in this zone, and communicates with a space or chamber above the diaphragm assembly of the thermostatic expansion valve later more fully described, as through a line of tubing BT. Such a connection is, of itself, well known in the operation of conventional thermostatic expansion valve assemblies.

Referring now more particularly to the thermostatic expansion valve assembly per se, as best shown by Fig. 2, this unit includes a body 14 provided with the inlet fitting IF and a discharge fitting DF of any suitable form. Within the body is formed a liquid passage 17 directed into a bore just above a threaded plug 20, the latter being provided with an axial passage, the lowermost portion of which is flared and lapped or otherwise finished to form a valve seat 21, on and off of which operates the valve pin element 22 provided with a cone or needle seating portion, substantially as shown. The valve pin 22 is carried by a pin holder 23 slidably associated with and guidedly engaged by the wall portions defining a finished cylindrical bore 24. The pin holder 23 is formed so as to receive a valve return spring 25 the lower or innermost end of which is seated upon a saddle 26, the saddle being centrally supported by a threaded adjusting element 27 engaging internal threads in the upper portion of a threaded closure plug 30, the element 27 being suitably packed as indicated at 31, and its projecting end protected by a sealing closure 32.

The opposite end of the body 14 is externally threaded and is surmounted by an internally threaded closure 33, an upper portion which is provided with an annular portion 34 peripherally embracing and guiding a buffer plate 35. The buffer plate constitutes a central backing element for a diaphragm such as 36, the diaphragm being peripherally gripped and sealed by and between a flared housing element 37 and a second housing element 40, as will appear from Fig. 2.

An outer closure for the diaphragm casing is of generally circular form, outwardly convex, and is indicated at 41, while between the elements 40 and 41 is peripherally gripped and sealed a second flexible diaphragm 42 above which there is normally a chamber of varying size, indicated at 43 and into which opens, through a fitting 44, the feeler bulb tubing BT. The elements within the diaphragm chamber of this assembly will be hereinafter more fully described.

Assuming for the present that movement be imparted to the diaphragm 36 and buffer plate 35 incident to thermal change in the content of the bulb B and tubing BT as well as chamber 43, such movement of the buffer plate is transmitted to the pin holder 23 through a pair or more of push rods, one of which is shown at 45, a companion such rod being identical but not shown. The push rods serve operatively to transmit the motion of the buffer plate 35 directly to the pin holder 23, hence to the valve pin 22. The push rods are at all times kept under some degree of compression, since they are subject to the opposite pressures of the valve spring 25 and the diaphragm 36 and buffer plate 35.

A thermostatic expansion valve as thus far described, with the exception of the second diaphragm and the annular casing or housing element 40, is or may be identical with the type "G" expansion valves produced and sold by Sporlan Valve Company of St. Louis, Missouri, this description being introduced for completeness but without restriction to this particular design or type of valve assembly.

The present improvements by virtue of which a controlled action of the thermostatic expansion valve element 22 takes place under the influence of the fluid motor identified with the bulb B, and the opposing pressures derived in part from the valve spring 25, and in further part, from the passage 13 communicating with the refrigerant flow circuit, will now be described.

Referring now more particularly to the structure and function thereof, characterizing the present invention by way of example, it is believed the present improvements may be better understood if it first be assumed, as in certain conventional types of expansion valve assemblies, that the closure or cap 41 is assembled directly to diaphragm 36 and element 33—37. In such case, upon an increase of pressure in bulb B and line BT, pressure applied directly to diaphragm 36 will actuate the valve 22 toward opening position, through the buffer plate, push rods and pin carrier. Structure added to this arrangement may if desired, consist of a separate article of manufacture for installation in existing valves. This includes a second diaphragm 42, a second buffer plate 50 and a third buffer plate 51. It will be noted that each of the buffer elements 50 and 51 is formed to provide an annular socket or recess such as 52 in plate 50, and 53 in plate 51, these recesses serving to receive and position the ends of a spring 54. This latter is preferably of coil type, and a compression spring, being installed under a loading such that it tends normally to separate or increase the spacing of the diaphragms 36 and 42.

It is of further advantage that each of the several buffer plates be guidedly constrained to a straight line movement; this is true of the plate 35 earlier described, which is guidedly positioned for a minor reciprocal movement by and within the element 33. This same function is cared for as to buffer plates 50 and 51, by an annular intermediate portion of the member 40, particularly indicated at 55.

It is necessary to limit the extent of possible separation of the diaphragms 42 and 36, this function being cared for by a distance piece shown as being in the form of a screw element 56 which is rigidly attached, as by threading, to a tapped central socket portion of the buffer plate 51. The plate 50 is provided with a central stepped aperture through which in assembly, the screw 56 freely extends, and the stepped diameter provides with the screw, a lost-motion connection between the screw and plate 50 thus enabling for example, downward movement (Fig. 2) of the plate 50 and diaphragm 42 without necessarily effecting any comparable movement of plate 51 and diaphragm 36.

It is desirable to limit the movement of the whole diaphragm, plate and spring assembly, to a range within narrow limits, say twenty-five one-thousandths inch for example, so as to avoid any undue range of flexure of either diaphragm. To this end it will be noted that the possible downward movement (Fig. 2) of plate 50 will be limited by engagement of its planar portion with the upper edge of the annulus 55. Normally there will be no tendency for this plate and diaphragm to move outwardly much farther than as illustrated. Similarly, upward movement of plate 51 will be limited by the lower margin or rim of portion 55, and downward movement of plate 35 will be limited by engagement with a small annular extension 57, on element 34.

While it is thought that the operation and advantages of the device will have become apparent from the foregoing description of its elements in preferred form, the function of the assembly will become more apparent if it be assumed that the pressure of the vapor or liquid in the bulb line, hence in the top diaphragm chamber 43, be high, for example 70 lbs., as will be typical when the system is first started in operation. Assuming the area of diaphragm 42 to be two square inches, there exists under this condition a total pressure of 140 lbs. acting downwardly against diaphragm 42 and plate 50. This plate is then actuated downwardly against the element 55, and but for present improvements, such action would result in a full extent of valve opening movement.

Under the conditions described, the valve 22 will open temporarily. Let it be assumed that the loading of spring 54, is 20 lbs. total, and that the pressure in the chamber between the two diaphragms, is atmospheric, or zero gauge pressure. It will now appear that the total net effect of downward actuation of diaphragm 42, is of the order of 20 lbs., acting against plate 51 and diaphragm 36. It should however be noted that this pressure is not unopposed, due to the effect in opposition to spring 54, of the closing spring 25 acting on valve 22, hence through rods 45 and plate 35 serving partly to offset the noted 20 lb. downward pressure. If it be assumed that the loading of spring 25 is 10 lbs. there will prevail a net pressure of 10 lbs., acting to open valve 22, and when this valve opens, admitting refrigerant to the evaporator. The evaporator pressure obviously soon rises. When it has reached a value say of 5 lbs. per square inch, assuming a two square inch area of diaphragm 36, the evaporator pressure acting through the internal equalizing bore 13, will now exert an upward force of 10 lbs., which with a 10 lb. upward pressure of spring 25, balances the downward bias. In this manner the valve actuated through the attachment described, will act to regulate the evaporator pressure to a maximum of 5 lbs. per square inch. This result is attained as will have been noted, since due to the provision of stops limiting the movement of the several buffer plates, it is impossible to transmit through the double diaphragm assembly any pressure beyond that of the loading of spring 54, as supplemented by fluid pressure in the chamber or cell constituted by member 40—55 and the diaphragms.

A somewhat different condition will usually prevail during the normal running cycle of the cooling system, in that a much lower range of pressures will be applied to diaphragm 42, by the bulb system B—BT. Under these conditions let it be assumed that the bulb system exerts a downward fluid pressure on diaphragm 42 say of 5 lbs. p. s. i. or 10 lbs. total. The spring pressure in an upward direction (Fig. 2) remains say 10 lbs. total. Let it now be assumed for illustration that the evaporator pressure is zero gauge. Under these conditions, spring 54 is extended as far as permitted by the distance screw 56, and thus the two diaphragms 36 and 42 will act together as a unit, and the valve 22 will under these conditions, be operated in much the same manner as if only a single diaphragm were employed.

In the arrangement described, it is advisable that the pressure in the sealed space or chamber between diaphragms 36 and 42, be less than the total of the loading of spring 25, and the minimum evaporator pressure. If this is not the case, the intermediate pressure may act to open the valve port 21, during times when such opening is not required or desired. Depending of course on selection of spring characteristics, it is possible to draw and hold a high vacuum within the diaphragm cell or chamber between elements 42 and 36, so as to prevent the action noted as otherwise likely. In this case the spring 54 between the two plates must be correspondingly increased, inasmuch as maximum operating pressure is determined by the air or other fluid pressure between the diaphragms, as augmented by the spring pressure.

It will now have appeared that particularly during the period of starting up the system, evaporator pressures, hence load on the machine, are desirably restricted by compression of spring 54, and that the arrangement in fact serves to limit valve actuating pressures in either direction through this part of the assembly or attachment. On the other hand, during periods of normal operation of the system, the added facilities may in no wise affect normal operation.

In case it is desired to evacuate the chamber or cell between and partly enclosed by the diaphragms 36 and 42, there is for convenience provided a usual charging tube or connection, indicated at 60, which may serve as a vacuum attachment to this space, and thereafter securely sealed off.

It will now have appeared that the combination as described is susceptible of usage in a wide variety of fields wherein fluid-actuated valves may be employed; furthermore, that the improvements may be separately produced and sold as an article of manufacture with the noted advantages, and in full attainment of the several objectives above expressed.

Although the invention has been described by making detailed reference to a single assembly embodiment, the detail of description should be understood in an instructive sense, rather than limiting, because of the numerous variants possible within the scope of the claims hereunto appended.

I claim as my invention:

1. In a thermostatic expansion valve assembly in and for the control of a compressor-condenser-evaporator system, and including a fluid motor having a diaphragm movably responsive to thermal requirements of the system, the combination therewith of a casing constituting an attachment adapted to be carried by the valve assembly and providing therefor inner and outer enlarged chambers and an intermediate chamber having a cylindrical wall, a flexible diaphragm secured in said inner enlarged chamber, the fluid motor being connected to the outer enlarged chamber with the diaphragm therein operative in said outer chamber, the diaphragms being of substantially equal areas, an element carried in the valve assembly to extend between said flexible diaphragm and the expansion valve for translating motion of the latter diaphragm to the expansion valve, a spring located in the intermediate chamber and acting to separate the said flexible diaphragm, and the diaphragm of the fluid motor, a buffer plate operatively associated with each diaphragm and having a sliding contact at the cylindrical wall of the intermediate chamber, said buffer plates providing seats for the opposite ends of said diaphragm separating spring, and means between said buffer plates limiting the extent of their possible separation and hence possible separation of said diaphragms, said means being adapted to permit a range of relative movement of said buffer plates, within such limit of possible separation.

2. The combination and arrangement of elements as recited by claim 1 but further characterized in that the cylindrical wall of said intermediate chamber is formed with an axially extended annular rib at its opposite ends for engagement by the adjacent buffer plates to limit the possible inward relative movement thereof in opposition to said spring.

3. In a thermostatic expansion valve assembly in and for a compressor-condenser-evaporator system, said system including a refrigerant control valve, and a diaphragm type fluid motor, the combination therewith of a sealed cell carried by and serving as an attachment for the assembly and acting to complete an operative connection between the fluid motor diaphragm and the control valve, the cell including spaced casing portions of enlarged cross-sectional area, a diaphragm in one casing portion, the fluid motor having its diaphragm in the other casing portion, and an intermediate casing portion of relatively reduced cross-sectional area opening to said enlarged casing portions between said diaphragms, the diaphragm being of an equal effective area with respect to the fluid motor diaphragm, a pair of buffer plates in the cell one adjacent each diaphragm, said buffer plates being formed and adapted to have a close sliding fit in said intermediate casing portion for linear guidance thereof, a spring abutting the buffer plates and acting to separate the same, and a distance element secured to one buffer plate and having a lost-motion connection with the other buffer plate.

4. In a thermostatic expansion valve assembly in and for a compressor-condenser-evaporator system, said system including a refrigerant control valve including a movable valve carrier, and a diaphragm type fluid motor, the combination therewith of a sealed cell carried by and serving to complete an operative connection between the diaphragm of the fluid motor and the control valve, the cell including spaced casing portions of enlarged annular form, a diaphragm of equal effective area relative to the fluid motor diaphragm secured in one casing portion, the fluid motor diaphragm being in the other casing portion, and an intermediate casing portion having a cylindrical wall of relatively reduced diametral extent, a pair of buffer plates in the cell one adjacent each diaphragm, said buffer plates being formed and adapted to have a close sliding fit with said cylindrical wall of the intermediate casing portions for linear guidance thereof, a spring abutting the buffer plates and acting to separate the same, a distance element secured to one buffer plate and having a lost-motion connection with the other buffer plate, a third buffer plate adjacent said diaphragm and external of the sealed cell, and push rod elements extending between said third buffer plate and the valve carrier for translating movement of the diaphragm to the valve carrier and hence to the refrigerant control valve.

HAROLD T. LANGE.

REFERENCES CITED

The following references are of record in the file of this patent:

UNITED STATES PATENTS

| Number | Name | Date |
|---|---|---|
| 1,974,631 | Slagel | Sept. 25, 1934 |
| 2,192,117 | Wile | Feb. 27, 1940 |
| 2,201,728 | Hoesel | May 21, 1940 |